United States Patent
Midwinter

[11] 3,719,411
[45] March 6, 1973

[54] CONTINUOUS COUPLING OF TUNABLE OR BROAD BAND RADIATION INTO THIN FILM WAVEGUIDES

[75] Inventor: John Edwin Midwinter, Morristown, N.J.

[73] Assignee: Allied Chemical Corporation, New York, N.Y.

[22] Filed: March 17, 1971

[21] Appl. No.: 125,094

[52] U.S. Cl. ...................................350/96 WG
[51] Int. Cl. ...................................G02b 5/14
[58] Field of Search ......................350/96 WG

[56] References Cited

UNITED STATES PATENTS 3,489,481   1/1970   Osterberg et al............350/96 WG X

OTHER PUBLICATIONS

Harris et al., "Beam Coupling to Films," Journal of the Optical Society of America, Vol. 60, No. 8, Aug. 1970, pp. 1007–1016.

*Primary Examiner*—John K. Corbin
*Attorney*—Arthur J. Plantamura and Herbert G. Burkard

[57] ABSTRACT

A technique is described for designing and constructing a thin-film waveguide/coupler combination that will allow the continuous coupling of a beam of broad band or tunable radiation from a laser-like source into a thin-film waveguide that is deposited on a suitable substrate. This is achieved by selection of a combination of materials having proper refractive indices in a sandwich structure which comprises the waveguide resulting in high efficiency without resource to any mechanical realignment of the angle of incidence of the light beam relative to the waveguide as the frequency to be coupled varies.

3 Claims, 5 Drawing Figures

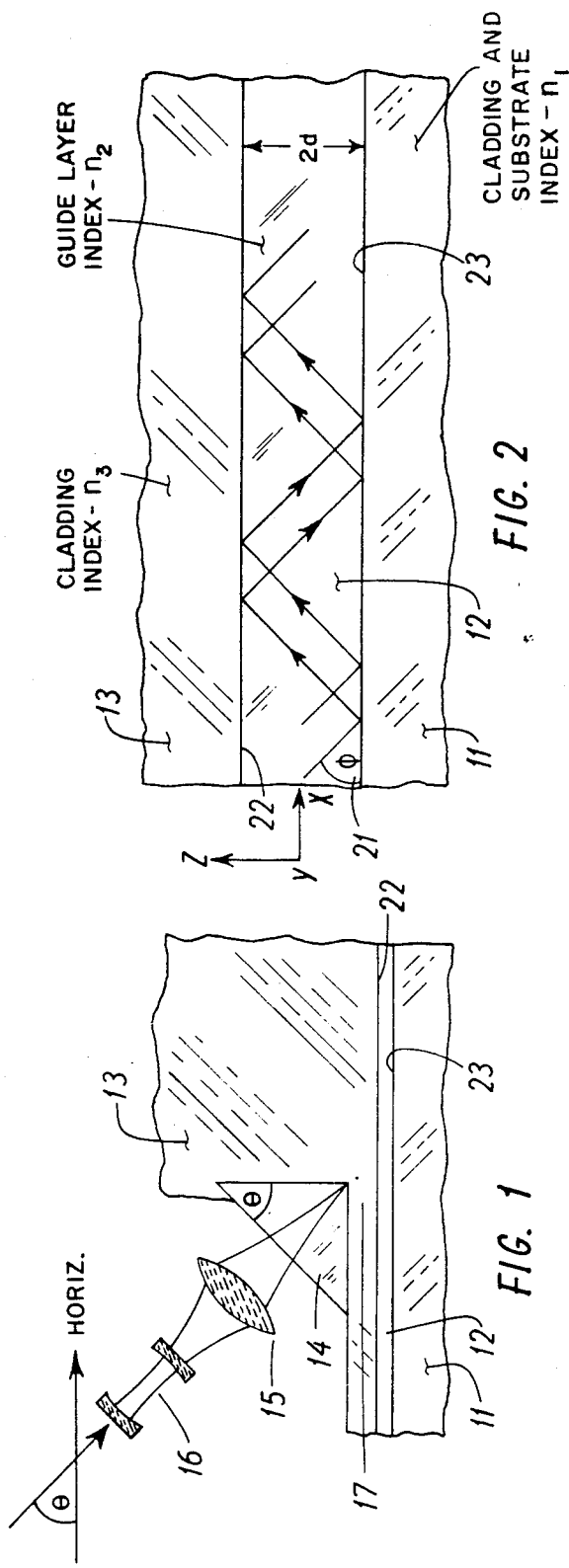
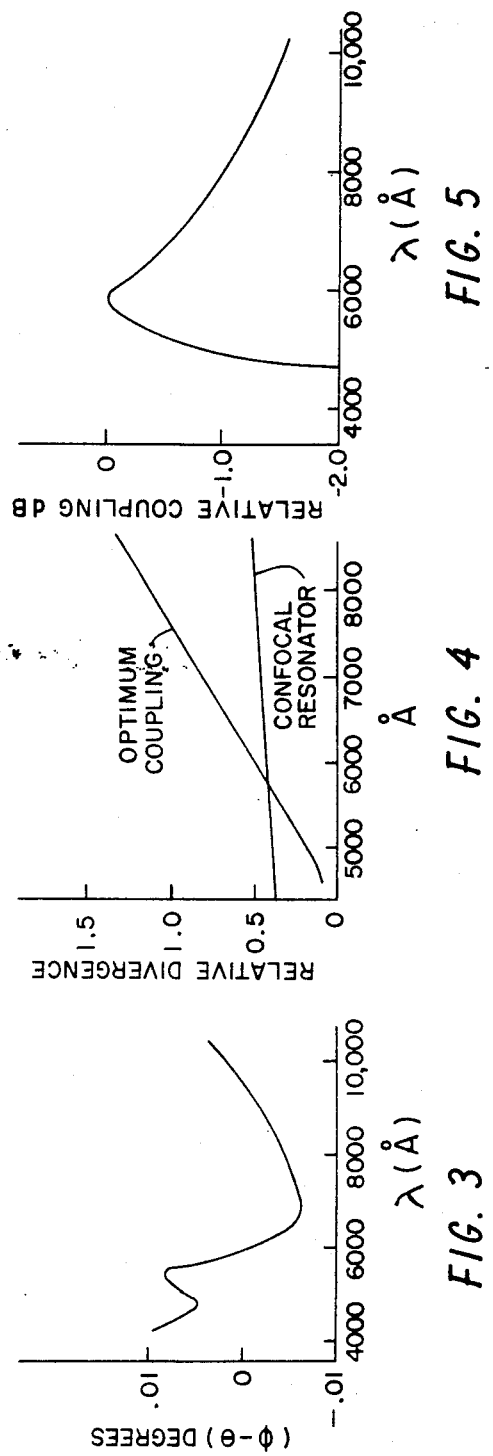

CONTINUOUS COUPLING OF TUNABLE OR BROAD BAND RADIATION INTO THIN FILM WAVEGUIDES

BACKGROUND OF THE INVENTION

This invention relates to an improved method for coupling light waves into thin films. Light-wave coupling has been described, for example, by P.K. Tien in the Journal of the Optical Society of America, Vol. 60, page 1,325, et seq. (1970); by J. E. Midwinter in the IEEE Journal of Quantum Electronics, Vol. Q46, page 583, et seq (1970); and by F. Zernike and J. E. Midwinter in the same journal, Vol. 60, page 577; and by J. H. Harris, R. Schubert and J. N. Polky in The Journal of the Optical Society of America, Vol. 60, page 1,008, et seq, (1970).

The aims of this technology are to permit the linkage of high-power generation capability for optical radiation contained in laser sources with the capabilities for processing of information using light which is trapped in a thin-film waveguide. The invention finds application, for example, in the transmission of information, the impression of information onto an existing optical carrier wave, amplification and frequency shifting of radiation injected into the films, interactions between streams of information impressed on optical beams of a data processing nature, or simple measurements made with the optical radiation in the guide of some characteristic of the optical waveguide or its surroundings. The invention finds particularly advantageous application in connection with this latter use.

In the disclosure which follows, the description is written in terms of visible radiation using the terms such as light and optical, although it will be understood that the techniques provided by the invention are equally applicable to nonvisible radiation in the ultraviolet or infrared spectrum by the choice of suitable materials that transmit at those wavelengths. Additionally, the terms "broad-band" and "tunable" are employed herein to describe radiation whose frequency may span a large frequency range so that it is not of significant consequence in design procedures whether the range is covered by the simultaneous generation of many frequencies or by the generation of a single, but time variable, frequency.

In previous work, attention has been directed to the coupling of a single frequency of radiation into a thin-film waveguide, although the generation of other frequencies within the waveguide environment by non-linear interaction and its subsequent coupling out of the waveguide environment into the surrounding space by a coupler system has also been considered. The principle of operation of all the prior art devices described heretofore is essentially similar, i.e., the collimated beam of optical energy from a single transverse mode laser source that is to be coupled into the thin film is allowed to be reflected by internal reflection from the inner surface of a high refractive-index surface. Some of the energy of that beam crosses the surface and appears outside it in the evanescent wave. If the total reflecting surface is then brought near to the guide layer, the evanescent field begins to penetrate the guide and energy can flow from the impinging beam into the guide. The internal reflection is then only partial or frustrated. By terminating the high index surface at the edge of the impinging beam, it is possible to trap a large part of the beam energy in the thin film guide. The termination mechanism of this frustrated total reflection surface comprises the element referred to as a prism which is placed contiguous to the guide layer, i.e., the prism surface adjoining the guide layer is placed close to the guide but does not touch it. Moreover, the surface of prism close to the guide layer may be either parallel to the guide or at some angle to it, and it is not essential that it be a plane layer but it may be curved in some constructions. However, the invention will be described in terms of a plane-surfaced prism placed with its frustrated reflecting surface parallel to the guide layer as illustrated in the drawing, since this is the simplest geometry for purposes of analysis.

The conditions for maximizing the efficiency of trapping of energy in the guide layer are important considerations; two conditions must be fulfilled: one is that phase-matching must be achieved between the impinging beam and the excited wave in the guide layer which is done by adjusting the angle of incidence of the impinging beam; the second condition involves careful adjustment of the size of the gap between the reflecting surface and the waveguide and the positioning of the termination of the reflecting surface relative to the beam cross-section. Both affect the coupling efficiency and have been discussed in the prior art.

SUMMARY OF THE INVENTION

The present invention is concerned with an improvement in the technique of light-wave coupling into thin films and more particularly with an improved arrangement by means of which the prior art means of coupling a single frequency of radiation into the thin-film waveguide can be made so that the single frequency source can be replaced by a tunable source such as a dye-laser or optical parametric oscillator or by a broad-band source of single transverse mode collimated radiation without loss of over-all coupling efficiency. The objectives of the invention are achieved without resource to any mechanical realignment of the source relative to the guide layer, which would in general have been necessary with a conventional coupler/guide system of the prior art.

In accordance with the invention, a unit may be constructed by following the design and construction steps to be outlined hereinafter which comprises a rigid source/coupler waveguide system in which the frequency of the source is allowed to cover a wide frequency band (typically three to one in extent) and which affords efficient coupling of energy to be maintained throughout this band once the system has been correctly constructed and set up. Such a capability was not contemplated by the prior art, which teaches rather that the device provides frequency selectivity since phase-matching at a particular frequency depends upon the use of a corresponding angle of incidence on the prism internal reflection surface, e.g. see U.S. Pat. No. 3,584,230. In accordance with the invention, I have found, contrarily, that under certain conditions use may be made of this fact in the construction of certain novel and useful light-wave coupling devices. The novel result is achieved through the careful design and construction of the various components that go to make up the coupler. The physical embodiment of the resulting coupler/waveguide system does not differ in most respects from the system of the prior art; it differs essentially, however, in the careful selection, preparation and deposition of material used in producing the coupler/waveguide system. In general, the system of the invention is directed to an arrangement in which the phase-matching involved in the energy transfer process from the impinging beam to the guide wave or mode becomes essentially insensitive to the frequency change. The technique is applicable to any of the various forms of prior art devices described in the above-noted prior art disclosures. For simplicity, however, the description of the invention will be limited to a single geometry as shown in the figures of the appended drawing.

DESCRIPTION OF THE PREFERRED EMBODIMENT

In the illustrative embodiment of the invention as seen by reference to FIG. 1, the coupling angle $\theta$ can be made essentially invariant with the frequency of the input radiation over a broad band of frequencies. This is to be achieved by the selection, in the first place, of materials of construction of the guide/coupler combination according to certain prerequisites and the subsequent calculation of the correct guide thickness to produce the required characteristic. The production of a guide of the required design thickness is derived through the utilization of already established techniques. However, the general form of the system to be considered will be as shown in the illustrative arrangement of FIG. 1. A substrate or cladding 11 is shown as providing support for the waveguide structure. The substrate 11 has an index refraction $n_1$. Superimposed on substrate 11 a thin layer 12 of higher index material (index $n_2$) is deposited. The layer 12 functions as the guide layer. Superimposed on layer 12 is an upper cladding 13 which in general is relatively thick compared to the guide layer 12. The layer 13 has an index of refraction $n_3$. For the purposes of coupling radiation into the film, a prism 14 of high index material will be used which is brought close to the guiding layer 12 but not into contact with it. The index of refraction of the prism is $n_4$ which may be the same as the guiding layer $n_2$. The upper cladding of the layer 13 with index $n_3$ may be air or liquid or a solid material deposited by any convenient means. The guide layer 12 is conveniently deposited such as by evaporation or sputtering; although other techniques may also be used. Also, while geometries other than that shown in FIG. 1 may be constructed in accordance with the invention, the above is preferred because of the convenience of manufacture.

The light source 16 such as a laser is fixed at some angle $\theta$ to the guide layer. Reference is made to the upper and lower claddings 13 and 11, respectively without implying that the structure must necessarily be oriented in the specific manner shown.

BRIEF DESCRIPTION OF THE DRAWING

A detailed understanding of the invention will be obtained from the following description, together with the drawing herein:

FIG. 1 is a layout drawing showing an illustrative embodiment of the general form of the source/coupler prism-waveguide in accordance with the invention.

FIG. 2 is a more detailed drawing of the waveguide layer and its surroundings to define the terminology used in the description.

FIG. 3 is a plot of the angular deviation from constant coupling angle as the typical radiation source is tuned through the visible spectrum demonstrating that the technique in accordance with the invention has yielded a device that is essentially insensitive to frequency.

FIG. 4 is a plot of the far-field beam divergence of an impinging laser beam as a function of wavelength across the visible spectrum if the utmost coupling efficiency is to be achieved referenced against the far-field beam divergence derived from a simple confocal resonator.

FIG. 5 is a plot of the estimated coupling efficiency for a confocal resonator into the thin-film waveguide over the frequency/wavelength range studied, normalized to zero decibel at the band center.

In order to establish the necessary rules to provide the waveguide coupling arrangement in accordance with the invention, it is first necessary to establish, by way of definition, the constraints that are applied by the guidance process upon the propagation angle for a wave in the guide. Referring now to FIG. 2, a wave in the guide 12 can be considered to propagate an an angle $\phi$, shown at 21, to the guide direction by reflection at the top and bottom surfaces 22 and 23, respectively of the guide layer. Where the refractive index of the guide layer 12 is $n_2$ and the refractive index of the coupling prism 14 is $n_4$, then the angles $\phi$ and $\theta$ are related by Snell's Law as follows:

$$\cos \theta = (n_2/n_4) \cos \phi \qquad (I)$$

It is noted that the cosine appears in place of the sine because of the angle definitions adopted.

It is common practice to define the guided waves in the guidance layer 12 and in the upper and lower claddings 13 and 11, respectively, in the following form, for transverse electric mode in which the electric vector is purely transverse and along the direction of the Y axis and perpendicular to the X and Z axes. (FIG. 2) Then, the electric field E for the three media is represented by the formula:

$$E_y(1) = A \exp(-\beta_1 z) \qquad (II)$$

$$E_y(2) = B \exp(-i\gamma_2 z) + B' \exp(i\gamma_2 z) \qquad (III)$$

$$E_y(3) = C \exp(\beta_3 z) \qquad (IV)$$

where:

$$\beta_1^2 = k_x^2 - n_1^2 k_o^2 \qquad (V)$$

$$\gamma_2^2 = n_2^2 k_o^2 - k_x^2 \qquad (VI)$$

$$\beta_3^2 = k_x^2 - n_3^2 k_o^2 \qquad (VII)$$

$$k_o = \omega/c \qquad (VIII)$$

where $\omega$ is the frequency of the radiation in radions per second and $c$ is the velocity of light. Thus all the waves propagate in the $x$ direction as $\exp(-ik_x x)$ and with transverse propagation in the $z$ direction described by the real and imaginary components respectively of $\gamma_2$ and $\beta_1$ and $\beta_3$.

The relative electric field amplitudes A, B, B' and C are determined by equating the electric and magnetic field components at the boundaries, the absolute values are obtained from the power flow relations (Poynting's vector) which, for the purposes of the present invention, are not critical. However, it is found that, in order to have a propagating mode of the guide, only certain discrete values of the transverse propagation constants $\beta_1, \gamma_2 \beta_3$ may be tolerated. These are obtained from the solutions to the equation below.

$$2\gamma_2 d - m\pi = \tan^{-1}(\beta_1/\gamma_2) + \tan^{-1}(\beta_3/\gamma 2) \quad (IX)$$

where $2d$ is the mechanical thickness of the guide layer.

Since this equation only has solutions for discrete values of $k_x$ corresponding to the allowed modes of propagation of the guide which are characterized by the integer values of $m$, only discrete values of $\phi$ are allowed since $$\tan \phi = (\gamma_2/k_x) \quad (X)$$

Detailed derivations for the above results have been published heretofore, e.g., in the disclosures of P. K. Tien or J. E. Midwinter, supra.

The physical interpretation of the foregoing equation (IX) is readily apparent and aids in understanding the operation of the broad-band coupler. The left-hand side of the equation represents half the phase retardation suffered as transverse component of the guide wave wave travels across the thickness $2d$ of the guiding layer. The two terms on the right-hand side of the equation represent respectively half the phase change on total internal reflection of the guide wave at the lower and upper boundaries of the guide layer. Thus, the equation requires only that the net round-trip phase delay of the wave be an integral multiple of $2\pi$, which is the appropriate condition for constructive interference of the wave.

The design conditions for broad-band operations are obtained by seeking solutions for Eq. (IX) above such that for a fixed but selectively defined value of the guide half thickness, $d$, the ratio of $(\gamma_2/k_x)$ does not vary significantly as the frequency of the wave is varied. One way, illustratively, of obtaining an approximate solution to the condition is to equate the differentials with respect to frequency of the left- and right-hand sides of Eq. (IX) after making a simple substitution as follows:

$$K = k_x/n_2 k_0 = \cos \phi \quad (XI)$$

then $$\tan \phi = (\sqrt{1-K^2}/K) \quad (XII)$$

The equation so obtained can then be solved simultaneously with Eq. (IX) to yield unique values of $K$ and $d$. The value of $d$ so obtained will be near to the best choice value for broad-band operation. Thus, recasting Eq. (IX) in terms of the variable $K$ and forming the new equation from its differentials, we obtain the two results for the $TE_o$ mode:

$$2n_2(\omega/c)d\sqrt{1-k^2}\Big|_{\omega_0} = \tan^{-1}\sqrt{\frac{n_2^2 K^2 - n_1^2}{n_2^2(1-K^2)}}$$

$$+ \tan^{-1}\sqrt{\frac{n_2^2 K^2 - n_3^2}{n_2^2(1-K^2)}}\Big|_{\omega_0} \quad (XIII)$$

$$2d\left[\frac{\delta n_2}{\delta \omega}\frac{\omega}{c} + \frac{n_2}{c}\right]\Big|_{\omega_0} = \frac{1}{\sqrt{K^2 - n_1^2/n_2^2}}\left(\frac{n_1^2}{n_2^2 - n_1^2}\right)\left[\frac{1}{n_2}\frac{\delta n_2}{\delta \omega}\right.$$

$$\left.- \frac{1}{n_1}\frac{\delta n_1}{\delta \omega}\right] + \frac{1}{\sqrt{K^2 - n_3^2/n_2^2}}\left(\frac{n_3^2}{n_2^2 - n_3^2}\right)\left[\frac{1}{n_2}\frac{\delta n_2}{\delta \omega} - \frac{1}{n_3}\frac{\delta n_3}{\delta \omega}\right]\Big|_{\omega_0} \quad (XIV)$$

where $\delta$ = partial differential.

The following design procedures are employed in preparing the board-band waveguide coupler. The materials of construction are selected so that the refractive indices over the frequency band of interest and their dispersion characteristics are known. It is necessary to ascertain that at least one of the following conditions is satisfied (and preferably both) in order that Eq. (XIV) produces a physical solution:

$$\left(\frac{1}{n_2}\frac{\delta n_2}{\delta \omega}\right) > \left(\frac{1}{n_1}\frac{\delta n_1}{\delta \omega}\right) \quad (XV)$$

and/or $$\left(\frac{1}{n_2}\frac{\delta n_2}{\delta \omega}\right) > \left(\frac{1}{n_3}\frac{\delta n_3}{\delta \omega}\right) \quad (XVI)$$

Having done this, the numerical values for the materials chosen for the substrate 11, guide 12 and upper cladding 13 can be inserted into the equations (XIII) and (XIV) to obtain the relation between $K$ and $d$. These equations can be solved simultaneously (most easily graphically) to obtain unique values of $K$ and $d$ which will correspond closely to those for broad-band operation, since in the first order they make the structure invariant with frequency. We have found in practice that better values are obtained by solving Eq. (XIII) or equivalently Eq. (IX), to obtain exact values of the mode propagation angle $\phi$ at a variety of frequencies and for a variety of thicknesses in the region around the value of $d$ derived above. The better value of $d$ is then chosen by inspection of the data to yield the most constant $\phi$ value for the band considered. This yields more accurate results, since there are no approximations involved in ignoring higher differentials which in practice contribute small but significant amounts.

The foregoing procedure derives the appropriate value of guide thickness for broad-band operation by assuming that the prism is constructed of the same material as the guide layer. In this case, $n_4 = n_2$ and $\theta = \phi$. In the event that a different material is chosen and one in which the ratio $n_4/n_2$ does not vary by a large amount over the band of frequencies to be studied, then the above design procedure can be repeated, initially solving for constant $\phi$ and then solving equations (I), (XII) and (XIII) to yield values for $\phi$ and $\theta$ with the different values of the guide half thickness $d$. The best choice of the half guide thickness for constant $\theta$ is obtainable by inspection but it will not be substantially different from that for the case of $n_4 = n_2$ above.

Where the ratio $n_4/n_2$ varies by a large amount over the frequency band under consideration, the best choice guide thickness is likely also to deviate considerably from the value derived by the simultaneous solution of equations (XIII) and (XIV).

The foregoing design procedure has been described for the transverse electric mode of guide propagation. However, it may be applied directly for the transverse magnetic case also by making the following changes:

In the equations (II), (III) and (IV), $B_Y$, the magnetic field, is substituted for $E_Y$, the electric field by way of field definitions. Equation (IX) becomes:

$$2\gamma_2 d - m\Pi = \tan^{-1}\left(\frac{n_2^2}{n_1^2}\frac{\beta_1}{\gamma_2}\right) + \tan^{-1}\left(\frac{n_2^2}{n_3^2}\frac{\beta_3}{\gamma_2}\right) \quad (XVII)$$

Thereupon, equations (XIII) and (XIV) become: for the transverse magnetic mode:

$$2\gamma_2 d - \tan^{-1}\left[\frac{n_2^2}{n_1^2}\sqrt{\frac{n_2^2 K^2 - n_1^2}{n_2^2(1-K^2)}}\right]$$
$$+ \tan^{-1}\left[\frac{n_2^2}{n_3^2}\sqrt{\frac{n_2^2 K^2 - n_3^2}{n_2^2(1-K^2)}}\right]$$
(XVIII)

$$2d\left(\frac{\omega}{c}\frac{\delta n_2}{\delta \omega} + \frac{n_2}{c}\right)$$
$$= \frac{(2n_2^2 K^2 - n_1^2)n_2 n_1^2}{K^2(n_2^4 - n_1^4) - n_1^2(n_2^2 - n_1^2)}\left(\frac{1}{n_2}\frac{\delta n_2}{\delta \omega} - \frac{1}{n_1}\frac{\delta n_1}{\delta \omega}\right)$$
$$+ \frac{(2n_2^2 K^2 - n_3^2)n_2^2 n_3^2}{K^2(n_2^4 - n_3^4) - n_3^2(n_2^2 - n_3^2)}\left(\frac{1}{n_2}\frac{\delta n_2}{\delta \omega} - \frac{1}{n_3}\frac{\delta n_3}{\delta \omega}\right)$$
(XIX)

The design procedure followed hereinabove is used, except equations (XVIII) and (XIX) are substituted in place of equations (XIII) and (XIV). The conditions of equations (XV) and (XVI) must still be satisfied, but an additional condition is placed upon the materials to be used, namely, $$n_2 > (\sqrt{2}\, n_1) \text{ and/or } n_2 > (\sqrt{2}\, n_3) \quad (XX)$$

This condition follows from the need to maintain a physical solution to equation (XIX).

These conditions being satisfied, the materials parameters are substituted in equations (XVIII) and (XIX) and the ensuing relations between $K$ and $d$ are solved simultaneously for specific $K$ and $d$ values. Final optimization is carried out by more precise numerical solution of equation (XVII) or (XVIII) using refractive index data over the whole frequency band as before. By a repeat of the already described procedure, the case of a different prism material to guide material can also be taken into account.

The physical operation of the broad-band coupler depends upon holding constant the round-trip phase delay for a wave propagating in the guide as the frequency of the wave is varied. Since $\gamma_2$ is almost directly proportional to the frequency, we see that the left-hand side of the waveguide phase or mode equation (IX) or (XVIII) is sharply dependent upon the frequency. This is balanced by making the right-hand side of the equations strongly dependent upon frequency by operating the waveguide near to the breakdown of total internal reflection. Then, it is well known that the phase change on internal reflection becomes a very sharply varying function of either the angle of incidence or the relative refractive indices of the media. For a more detailed explanation of this function, reference is made to Fundamentals of Optics, F. A. Jenkins and H. W. White, Chap. 25, p. 515, 3rd Ed., McGraw-Hill (New York) 1957. It is thus possible by the techniques described herein to balance the change in phase delay in traversing the guide by a change in phase shift on reflection brought about by the dispersion of the materials used as the frequency changes.

It is thus seen that a broad-band coupler may be designed and constructed pursuant to guidelines provided hereinabove. It is important to note that fairly accurate control of the variables must be adhered to at all stages if good performance is to be obtained. It is important not only to use materials whose indices correspond to those used in the design but to recognize that the refractive indices of many materials are different after evaporation or sputtering into a thin layer when compared to the bulk material. Where this occurs, it will be important to use refractive-index data representative of the deposited material rather than that of the bulk material. It will also be important to maintain close control over the thickness of the evaporated or otherwise-deposited guide layer. In order to more fully illustrate the nature of the invention and the manner of producing the same, the following example is presented wherein a particular case is examined to determine the performance characteristics that are possible.

EXAMPLE

Refractive-index data for two materials to represent respectively the prism and guide for one and the two claddings for the other are selected. The data used are taken from the Schott Optical Glass catalog of Jan. 1, 1971 published by Schott Optical Glass, Inc., Duryea, Pa. 18642, which lists the refractive indices for a wide range of glasses over a useful wavelength range. The two glasses chosen are the high index, high dispersion (SF6) and the low index, low dispersion (FK50) for the guide and cladding respectively. No implication is to be intended that only glasses can be used in the construction; they are chosen purely because tabulated data are readily available. These data are used to design a broad-band guide/coupler for $TE_o$ mode by the techniques outlined above. The wavelength band from 1.01 microns to 0.48 microns is examined thus straddling the visible region of the spectrum.

From the simultaneous solution of equations (XIII) and (XIV), a value for $d$ of 0.04 units, where the unit of length was defined in terms of a wavelength at 0.5893 microns, i.e., $d = 2.36 \times 10^{-6}$ cm. On solving equation (IX) alone for a variety of wavelengths and thicknesses in this region, it is found that for the band considered a better value for $d$ was 0.0447 units ($d = 2.634 \times 10^{-6}$ cm.). Using this value for $d$, the values of the angle $\phi$ were calculated at each of the wavelengths considered over the band and the angular error in the coupling angle, defined as the value of $\phi$ at the wavelength minus the value of $\phi$ at 0.5893 microns. The result of this evaluation is given in FIG. 3 which shows that to within 0.01°, the coupling angle is constant. The assumption that $n_4 = n_2$ was made for this case so that $\theta = \phi$.

The effect of deviations from the theoretical design in the refractive indices of the materials used and also in the thickness of the guide layer deposited was examined numerically. The result of this analysis is that for the coupling angle $\theta$ not to change by more than 0.001 radians over a visible wavelength range, the thickness of the layer must be controlled to about 5 percent and the indices of refraction of the materials used must be accurate to about 0.005, both of which are within the range of control by present technology.

The effect of a widely varying frequency range on the power coupling efficiency of the thin-film guide/coupler was also examined and it has been shown that for maximum coupling efficiency it is necessary to vary the far-field beam divergence of a single transverse mode laser beam entering the coupler prism according to the relation shown graphically in FIG. 4. Also, by using the beam taken from a fixed confocal resonator and the variation in beam divergence associated with that, it has been shown that without any further correction a variation of coupling efficiency of not more than 2 $dB$ is expected over the visible band as shown in FIG. 5. A flatter power-coupling characteristic could be achieved by the use of beam-forming optics.

It will be apparent that various modifications may be made in the details presented by way of illustration without departing from the scope and spirit of the invention.

Having described my invention, what I claim as new and desire to secure by Letter Patent is:

1. A method for rendering the normally frequency dependent propagation angle for plane wavefronts in a thin-film waveguide substantially insensitive to the frequency of the wave being propagated said waveguide comprises sandwiching a layer of high refractive index ($n_2$) between environments of two lower refractive indices ($n_1$) and ($n_3$) where materials $n_1$, $n_2$, $n_3$ are chosen so that for the transverse electric mode of propagation, a first condition in which $$\frac{1}{\sqrt{K^2-n_1^2 n_2^2}}\left(\frac{n_1^2}{n_2^2-n_1^2}\right)\left[\frac{1}{n_2}\frac{\delta n_2}{\delta\omega}-\frac{1}{n_1}\frac{\delta n_1}{\delta\omega}\right]$$
$$\cdot\frac{1}{\sqrt{K^2-n_3^2 n_2^2}}\left(\frac{n_3^2}{n_2^2-n_3^2}\right)\left[\frac{1}{n_2}\frac{\delta n_2}{\delta\omega}-\frac{1}{n_3}\frac{\delta n_3}{\delta\omega}\right]\Big|\omega_o$$

>0 obtains and for the transverse magnetic mode of propagation the condition $$\frac{(2n_2^2 K^2-n_1^2)n_2 n_1^2}{K^2(n_2^4-n_1^4)-n_1^2(n_2^2-n_1^2)}\left(\frac{1}{n_2}\frac{\delta n_2}{\delta\omega}-\frac{1}{n_1}\frac{\delta n_1}{\delta\omega}\right)$$
$$+\frac{(2n_2^2 K^2-n_3^2)n_2^2 n_3^2}{K^2(n_2^4-n_3^4)-n_3^2(n_2^2-n_3^2)}\left(\frac{1}{n_2}\frac{\delta n_2}{\delta\omega}-\frac{1}{n_3}\frac{\delta n_3}{\delta\omega}\right)$$

>0 obtains, wherein $\omega$ is the frequency of the radiation in radians per second and wherein said indices $n_1$, $n_2$ and $n_3$ and dispersions of these indices are evaluated at the center of the chosen operating frequency band, and where $K$ is equal to the cosine of the propagation angle $\phi$ for the guided wavefronts, the thickness of the guide layer of index $n_2$ being characterized such that for the propagating mode the change in phase shift for the wave traversing the guide as the frequency changes is substantially balanced by the change in the phase shift on total reflection at the boundaries of the guiding layer, the balancing of these relative phase shifts being judged over the whole of the frequency band desired for operation.

2. A method for coupling, wherein the coupling angle is substantially independent of frequency, a spatially coherent beam of broad-band radiation into a thin film waveguide, which comprises introducing the radiation into said waveguide by means of a prism, said prism being contiguous to one surface of the waveguide, being constructed according to the method of claim 1 and of a material having a refractive index $n_4$, the material and cut of said prism being such that the beam of collimated radiation enters the prism at normal incidence to arrive in the vicinity of the guide at an angle $\theta$ with respect to the guide layer, said angle $\theta$ being related to angle $\phi$ of the propagation of plane wavefronts within the waveguide by the formula:
$$n_2 \cos\phi = n_4 \cos\theta$$

material $n_4$ for said prism being chosen so that the ratio $n_2/n_4$ remains substantially constant throughout the frequency band of operation.

3. The method of claim 2 wherein the thickness of the waveguide is adjusted so that the angle $\theta$ in the equality $n_2 \cos\phi = n_4 \cos\theta$ remains substantially constant over the operating frequency band while the ratio $n_2/n_4$ by selection of prism material is permitted to vary over the same frequency band in which the guided wavefronts make an angle $\phi$ to the waveguide direction, said collimated beam entering said prism at normal incidence to arrive at an angle $\theta$ with the waveguide direction.

* * * * *